United States Patent Office 3,425,791
Patented Feb. 4, 1969

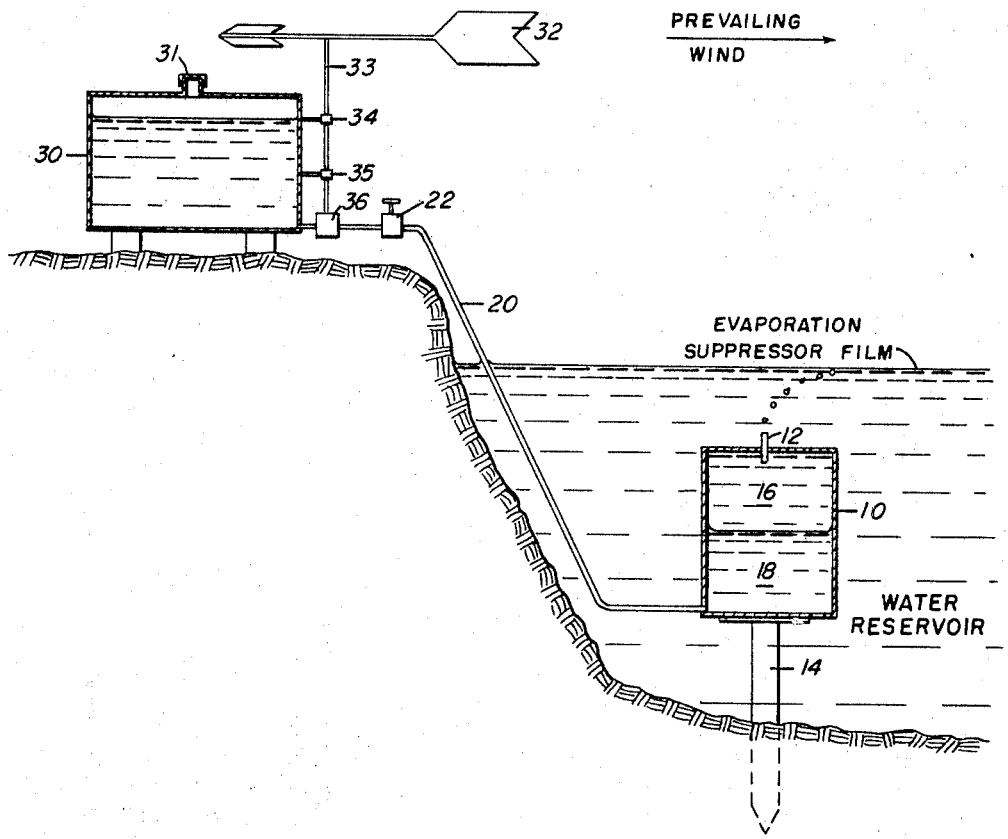

3,425,791
UNDERWATER GRAVITY-TYPE MONOMOLECULAR FILM DISPENSER AND METHOD OF USE
Gordon E. Koberg, Lakewood, Colo., assignor to the United States of America as represented by the Secretary of the Interior
Filed June 9, 1965, Ser. No. 462,764
U.S. Cl. 21—60.5                 9 Claims
Int. Cl. E03b 3/40

ABSTRACT OF THE DISCLOSURE

Evaporation loss from reservoirs and the like is reduced by the subsurface release of a film-forming material from a storage container located below the water surface. Film-forming material is forced from the container by hydrostatic pressure from a vessel containing a displacement fluid.

---

This invention resulted from work done by the U.S. Geological Survey of the Department of the Interior, and the domestic title to the invention is in the Government.

This invention relates to a novel dispensing system for evaporation suppressors.

In particular new methods and apparatus are presented for dispensing an agent for retarding evaporation from the surface of a body of liquid such as water ponds, wherein the suppressors are released below the water surface from a container.

The problem of reducing losses of liquids from the surface of storage ponds, tanks, and reservoirs is of considerable interest in agricultural areas and industrial applications. In arid regions the loss of water from open surfaces frequently exceeds the amount beneficially used. These losses add greatly to the design and operating costs of storage facilities. Also, livestock feeders, irrigators, industrial processors, and petroleum refiners are faced with a serious evaporation problem from stored liquids in open reservoirs. In addition to the particular problem existing in arid areas, there is the general problem of an acute universal water shortage. This comes about in part from the increase in world population coupled with rising individual water requirements which accompany the general increase in living standards throughout the world.

Evaporation loss of volatile liquids can be effectively decreased and inhibited by floating thereon a layer of a sealant. These agents may be in the form of dispersed waxes, gas-filled particles, film-forming compounds, or combinations of these. In the suppression of vapors on the surface of reservoirs containing volatile hydrocarbons, various organic materials such as cellulose derivatives, synthetic resins, and natural film-forming materials such as proteins or alginates may be used. The nature of the volatile liquid to be conserved determines the suppressor to be used on its surface to retard vaporization. Probably the most important volatile liquid considered by the prior art workers is water. It has been estimated that 50–70% of the total rainfall in the United States is lost by evaporation.

Perhaps the most successful attempts at low cost suppression of water vapor from reservoir surfaces have been those using film-forming compounds such as fatty alcohols. The alcohols are generally aliphatic compounds having from about 12 to about 30 carbon atoms in the molecular chain. These materials have been found desirable for retarding water vapor formation in U.S. Patents 2,878,098 to Trelvar et al., 3,082,058 to Rosano, 3,085,850 to Egan, 3,146,059 to Suzuki et al., 3,154,505 to Watanabe, and 2,903,330 to Dressler. The last mentioned of these describes the use of aqueous suspensions or emulsions of long-chain fatty alcohols for dispersing the evaporation suppressor films upon a water surface. Trelvar et al. and Water and Water Engineering, June 1957, pages 255–259, show the use of cetyl alcohol dissolved in a hydrocarbon solvent. Those compounds most of interest in this process were those containing 16 to 18 carbon atoms, such as hexadecanol, and octadecanol (in particular the alcohols having a normal structure, cetyl alcohol and stearyl alcohol).

The prior art workers distributed their suppressor films by applying the materials directly to the water surface, as by spraying, dripping, and floating. By applying the materials at a point on the upwind shoreline of a body of water, the film would be spread by natural means.

It has been found that by the use of an underwater container for the evaporation suppressor, that the material can be released just below the surface of the reservoir and the low-density suppressor will float upwardly and spread across the water surface in a monolayer with little waste of the suppressor material.

Accordingly, it is an object of this invention to provide a system for dispensing thin films upon open liquid bodies. In particular, it is an object of this invention to provide methods and apparatus for releasing an evaporation suppressor material from a subsurface container and permitting the material to form a low-density monomolecular layer film upon a surface of bodies of water such as ponds, open tanks, and reservoirs.

These and other objects and features of the present invention will be apparent from the following description thereof wherein reference is made to the drawing in which a schematic representation of the novel process and the apparatus for its operation is shown.

Under the surface of the liquid reservoir to be protected is located a container 10 having an outlet orifice 12. The container is usually in the form of a hollow drum or tank constructed of a suitable material such as steel or plastic. Container 10 is secured in a location near the shoreline of the body of water by an anchor 14, or other means such as a raft or buoy. In the container 10 is an evaporation suppressor liquid 16, which floats on a displacement liquid 18, such as water or other liquid having a greater specific gravity than the suppressor liquid. The displacement liquid 18 is supplied to the container 10 through a conduit 20, having a metering valve 22. The conduit may be a flexible tube of plastic or rubber. A storage means 30 is provided along the embankment of the reservoir at a sufficient height to create a hydrostatic or fluid head. This serves to pressurize the system and provide a driving force to release suppressor liquid from container 10 whenever the conduit is open. Storage tank 30 has a vented cap 31 and is provided with a wind direction detector such as vane 32. This vane is mounted on a shaft 33 for rotation with the wind and the shaft is secured to the storage tank 30 by support bearings and thrust collars 34, 35. Rotation of the wind vane 32 in response to changes in direction of the prevailing wind is transmitted via shaft 33 to a control valve 36, which may be an oblique bore plug valve arranged to open when the wind vane 32 is positioned in a given direction. Normally, the valve will be open when the prevailing wind is in a direction from the shoreline toward the center of the reservoir.

When using a higher density displacement fluid for releasing the suppressor liquid, the displacement fluid should be introduced at the bottom portions of the container to avoid mixing the phases in the container and to maintain the distinct layer effect. When an aqueous dispersion of fatty alcohol is used as the suppressor liquid, it has been found that the dispersion has sufficient buoyancy to permit floating the disperison on the displacement liquid, such as water. The outlet orifice 12 may be a ¼ inch opening, but the size and shape of the orifice is not critical. Tubing sizes of $\frac{3}{16}$ and ¼ inch have been used in the conduit system; however, the low range of flow required for operation of the apparatus allows the use of smaller conduit. Any combination of tubing and valves permitting a flow rate of about one gallon per day of displacement fluid to the subsurface container 10 will suffice in most circumstances.

Detection of wind direction is not essential to the practice of this invention; it represents a preferred embodiment only. The suppressor liquid may be metered continuously, intermittently, or the wind vane apparatus may be used to increase the flow rate at certain times. The wind detector may also be equipped with an electrical contact for operating an electric valve in a predetermined position.

The storage means 30 shown in the figure may be used to feed displacement liquid to a single subsurface container, or a multiple-container arrangement may be employed with several container facilities being operated by a single storage tank and/or wind detection apparatus. Normally, the subsurface containers 10 are spaced along a shoreline at intervals of about 50 to 200 feet for best coverage of the reservoir.

Experience has shown that the orifice 12 may be located near the water surface about 6 inches submerged. This depth may vary widely with the suppressor liquid and volatile liquid used in the process. In using a fatty alcohol dispersion as the suppression agent, the 6 inch depth prevents loss of the dispersion and promotes effective spreading of the film to form the monomolecular layer on the reservoir surface. Evaporation of the water, alcohol or other liquid in which the fatty alcohol is dissolved or dispersed cannot occur as the material leaves the orifice. Any difficulties which could arise by having the orifice above the water surface, due to clogging of the orifice by fatty acid as a result of evaporation of the liquid vehicle is eliminated by the subsurface location of orifice 12. As the dispersion of fatty alcohol is released from container 10, it rises to the water surface and upon breaking through the surface, immediately spreads into a monomolecular film over the extended open water surface.

Refilling of the subsurface container 10 and the storage tank 30 may be accomplished by any number of methods. One method is the reversal of flow of the displacement liquid. By connecting outlet orifice 12 to a supply of suppressor liquid and pressurizing the subsurface container, as by creating a hydrostatic head in the refill connection, the displacement liquid may be returned to the storage tank 30. Another method for refilling the system would be to pump displacement liquid from the subsurface container and return it to the storage means 30, and simultaneously filling container 10 with suppressor liquid from a supply tank through outlet 12.

While long-chain alcohols are the preferred suppression agent for use with the instant invention, others may be used. For instance, in U.S. Patent No. 3,095,263, Eckert and Hall, describe a water vapor suppressor comprising a film-forming wax, mineral oil additive, light hydrocarbon spreading agent, and oxidate material.

While the invention has been illustrated by specific examples, there is no intent to limit the invention to the specific details so disclosed, except insofar as set out in the following claims.

What is claimed is:

1. A system for dispensing a monomolecular evaporation suppressor layer onto the surface of a body of water comprising a subsurface container for a liquid dispersion of an evaporation suppressor, said container having an outlet orifice adjacent a top portion thereof;

a liquid storage means located above the surface of the body of water; and conduit means communicating between the liquid storage means and a bottom portion of the subsurface container, said storage means having sufficient hydrostatic head to force a displacement liquid from the storage means through the conduit means to the subsurface container.

2. Apparatus according to claim 1 wherein the storage means comprises a container means, wind detection means and means for stopping the flow of displacement liquid in response to wind direction.

3. Apparatus according to claim 2 wherein the wind direction means includes a wind vane and the means for stopping flow includes a valve connected to the wind vane, whereby the valve is closed and opened in response to changes in wind direction.

4. The apparatus of claim 3 wherein the outlet orifice is positioned about 6 inches below the water surface.

5. A method for retarding evaporation of a liquid body comprising the steps of maintaining evaporation suppressor liquid having a density less than that of the liquid body in a subsurface container below the surface of the liquid body, said subsurface container having an outlet orifice, and introducing a pressurized fluid into the subsurface container to force the evaporation suppressor from the subsurface container through the outlet orifice and onto the surface of the liquid body.

6. The method of claim 5 wherein the pressurized fluid is a liquid having a higher density than the evaporation suppressor and is introduced into a bottom portion of the subsurface container from a liquid storage means located above the surface of the liquid body and having sufficient liquid head to pressurize the subsurface container.

7. The method of claim 5 wherein the evaporation suppressor is released from the subsurface container in response to wind direction across the liquid body.

8. The method of claim 5 wherein the evaporation suppressor comprises an aqueous dispersion of a long-chain fatty alcohol and the liquid body is water.

9. The method of claim 8 wherein the long-chain fatty alcohol contains 16 to 18 carbon atoms.

References Cited

UNITED STATES PATENTS

| | | | |
|---|---|---|---|
| 1,831,476 | 11/1931 | Bennett | 222—54 |
| 2,747,774 | 5/1956 | Breitenbach | 61—.5 XR |
| 2,878,098 | 3/1959 | Trelvar et al. | 21—60.5 |
| 3,184,789 | 5/1965 | Florey et al. | 21—60.5 |
| 3,241,908 | 3/1966 | Mazur | 21—58 |

MORRIS O. WOLK, *Primary Examiner.*

D. G. MILLMAN, *Assistant Examiner.*

U.S. Cl. X.R.

21—61; 222—54; 61—1, .5